United States Patent
Nakamaru

(10) Patent No.: US 8,860,870 B2
(45) Date of Patent: Oct. 14, 2014

(54) IMAGING DEVICE, IMAGING METHOD AND RECORDING MEDIUM

(71) Applicant: FUJIFILM Corporation, Tokyo (JP)

(72) Inventor: Fumio Nakamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/229,207

(22) Filed: Mar. 28, 2014

(65) Prior Publication Data

US 2014/0211050 A1    Jul. 31, 2014

Related U.S. Application Data

(63) Continuation of application No. PCT/JP2012/074489, filed on Sep. 25, 2012.

(30) Foreign Application Priority Data

Sep. 30, 2011 (JP) ................. 2011-217891

(51) Int. Cl.
*H04N 5/232* (2006.01)
*G03B 13/00* (2006.01)

(52) U.S. Cl.
CPC ....... *H04N 5/23293* (2013.01); *H04N 5/23212* (2013.01)
USPC .................. 348/346; 348/333.02; 348/333.09

(58) Field of Classification Search
USPC ................................ 348/333.02, 333.09, 346
See application file for complete search history.

(56) References Cited

U.S. PATENT DOCUMENTS

2007/0052836 A1 * 3/2007 Yamada et al. ............... 348/345
2010/0259652 A1   10/2010 Miura

FOREIGN PATENT DOCUMENTS

| JP | 5-127244 A | 5/1993 |
| JP | 2001-042207 A | 2/2001 |
| JP | 2010-054921 A | 3/2010 |
| JP | 2010-135894 A | 6/2010 |
| JP | 2011-135351 A | 7/2011 |

OTHER PUBLICATIONS

International Search Report issued in PCT/JP2012/074489, mailed on Dec. 18, 2012.
Written Opinion issued in PCT/JP2012/074489, mailed on Dec. 18, 2012.

* cited by examiner

*Primary Examiner* — Anthony J Daniels
(74) *Attorney, Agent, or Firm* — Birch, Stewart, Kolasch & Birch, LLP

(57) ABSTRACT

An imaging method includes setting a manual focus mode for moving a focus lens according to an operation of an operation unit, generating a contrast image, which is an image in which an edge of a taken image is enhanced or extracted, and superimposing and displaying, in the case of the manual focus mode, the contrast image on an optical image of the object in an optical finder.

15 Claims, 11 Drawing Sheets

IMAGING DEVICE, IMAGING METHOD AND RECORDING MEDIUM

CROSS REFERENCE TO RELATED APPLICATIONS

This application is a Bypass Continuation of PCT International Application No. PCT/JP2012/074489 filed on Sep. 25, 2012, which claims priority under 35 U.S.C §119(a) to Patent Application No. 2011-217891 filed in Japan on Sep. 30, 2011, all of which are hereby expressly incorporated by reference into the present application.

BACKGROUND OF THE INVENTION

1. Field of the Invention

The presently disclosed subject matter relates to an imaging device, an imaging method, a recording medium and a program and, more particularly, to an imaging device including a finder optical system separately from an imaging optical system, an imaging method, a recording medium and a program.

2. Description of the Related Art

Japanese Patent Application Laid-Open No. 2011-135351 discloses a high vision digital video camera including a manual focus function for generating an edge component image on the basis of edge information extracted from an object image and forming the edge component image on an original object image displayed on a liquid crystal monitor or the like.

Japanese Patent Application Laid-Open No. 2001-042207 discloses that, at the time of a manual focus, an indicator indicating information concerning a distance to an object (e.g., a drive pulse value of a focus motor, a numerical value converted from distance indication or the like calculated by a predetermined arithmetic processing, and a focus evaluation value) is displayed on a liquid crystal monitor superimposed and displayed on an optical finder.

Japanese Patent Application Laid-Open No. 2010-135894 discloses a digital camera of a lens replacement type capable of superimposing and displaying an optical finder (OVF) and an electronic view finder (EVF). In the invention described in Japanese Patent Application Laid-Open No. 2010-135894, distance measurement is applied to a portion recognized as a face and a focus point is displayed in a position of the EVF corresponding to the portion recognized as the face.

SUMMARY OF THE INVENTION

However, the invention described in Japanese Patent Application Laid-Open No. 2011-135351 performs display using the electronic view finder and does not use the optical finder. In the electronic view finder, there is a time lag from imaging to display and an optical image is clearer than an electronic image. Therefore, there is a need to use the optical finder rather than the electronic view finder.

In the invention described in Japanese Patent Application Laid-Open No. 2001-042207, there is a problem in that, when the drive pulse value of the focus motor is displayed, the distance to the object is unknown and the object cannot be successfully focused. Even if the distance indication is displayed, there is a problem in that it is difficult to focus on the object when depth of field is small. Even if the indicator is displayed, there is a problem in that it cannot be determined an evaluation value of which position of a taken image the displayed focus evaluation value is and it cannot be determined which position is focused.

The invention described in Japanese Patent Application Laid-Open No. 2010-135894 is a camera of a single-lens type. Therefore, operation for focusing the camera in manual focus (MF) while looking into the optical finder is possible. However, in a camera that is not the single-lens type (in which an imaging optical system and a finder optical system are separately disposed), the camera cannot be focused in the MF only by the optical finder. The invention described in Japanese Patent Application Laid-Open No. 2010-135894 is the digital camera in which a lens can be replaced. Automatic focus control (AF control) cannot be performed depending on a combination of an attached lens and a camera body. In such a case, the camera has to be focused in the MF.

When a user focuses the camera in the MF while checking an object image on the electronic view finder or the liquid crystal monitor, there is a problem in that operation is annoying because the user needs to perform switching operation from the optical finder to the electronic view finder and look away from the optical finder and look at the liquid crystal monitor.

The presently disclosed subject matter has been devised in view of such circumstances and it is an object of the presently disclosed subject matter to provide an imaging device, an imaging method, a recording medium and a program with which, in a camera in which an imaging optical system and a finder optical system are separately disposed, it is possible to perform a focusing operation in a manual focus without looking away from an optical finder while securing visibility unique to the optical finder.

In order to attain the object, an imaging device according to an aspect of the presently disclosed subject matter includes: an imaging unit configured to acquire a taken image by imaging object light passed through an imaging optical system including a focus lens; an optical finder with which an optical image of an object can be observed; a setting unit configured to set a manual focus mode for moving the focus lens according to an operation of an operation unit; an image generating unit configured to generate a contrast image, which is an image in which an edge of the taken image is enhanced or extracted; a displaying unit configured to display the contrast image when the manual focus mode is set; and an image superimposing unit configured to superimpose the image displayed by the displaying unit on the optical image of the object in the optical finder.

With the imaging device according to the aspect of the presently disclosed subject matter, when the manual focus mode for moving the focus lens according to the operation of the operation unit is set, the contrast image, which is the image in which the edge of the taken image is enhanced or extracted, is generated and superimposed and displayed on the optical image. Consequently, it is possible to check a focused position without looking away from the optical finder.

The imaging device according to another aspect of the presently disclosed subject matter may further include a contrast evaluation value calculating unit configured to calculate a contrast evaluation value indicating an integrated value of a high-frequency component of the taken image concerning each of a plurality of areas in the taken image, and the image generating unit may change at least one of a color and thickness of an edge portion of the contrast image according to the calculated contrast evaluation value. Consequently, it is possible to more clearly show the focused position.

An imaging device according to an aspect of the presently disclosed subject matter includes: an imaging unit configured to acquire a taken image by imaging object light passed through an imaging optical system including a focus lens; an optical finder with which an optical image of an object can be observed; a setting unit configured to set a manual focus mode for moving the focus lens according to an operation of an operation unit; a contrast evaluation value calculating unit configured to calculate a contrast evaluation value indicating an integrated value of a high-frequency component of the taken image concerning each of a plurality of areas in the taken image; an image generating unit configured to generate a contrast image, which is an image representing a magnitude of the contrast evaluation value, in each of the plurality of areas; a displaying unit configured to display the contrast image when the manual focus mode is set; and an image superimposing unit configured to superimpose the image displayed by the displaying unit on the optical image of the object in the optical finder.

With the imaging device according to the aspect of the presently disclosed subject matter, when the manual focus mode for moving the focus lens according to the operation of the operation unit is set, the contrast image, which is the image representing the magnitude of the contrast evaluation value, is generated and superimposed and displayed on the optical image. Consequently, it is possible to quantitatively grasp whether the imaging device is focused.

In the imaging device according to another aspect of the presently disclosed subject matter, the optical finder may further include a transmittance changing unit configured to reduce transmittance of the optical image when the manual focus mode is set. Consequently, it is possible to clearly show the contrast image superimposed and displayed on the optical image.

The imaging device according to another aspect of the presently disclosed subject matter may further include a determining unit configured to determine whether the focus lens is being moved when the manual focus mode is set, and the display unit may display the contrast image only while the focus lens is being moved, or while the focus lens is being moved and until a fixed time elapses after the focus lens is stopped. Consequently, it is possible to erase the contrast image when the contrast image is unnecessary and clearly show the optical image.

In the imaging device according to another aspect of the presently disclosed subject matter, the imaging optical system and an optical system of the optical finder may be different, the imaging device may further include a positional deviation amount acquiring unit configured to acquire a deviation amount of the optical image and the contrast image according to a position of the focus lens, and an electronic view finder may correct a position of the contrast image according to the acquired positional deviation amount and display the contrast image. Consequently, it is possible to match the contrast image and the optical image even when there is a parallax.

The imaging device according to another aspect of the presently disclosed subject matter may further include an area setting unit configured to set an area in the taken image, and the image generating unit may generate the contrast image targeting an image in the area set by the area setting unit. Consequently, it is possible to keep the contrast image necessity minimum and clearly shown the optical image.

The imaging device according to another aspect of the presently disclosed subject matter may further include an area changing unit configured to change at least one of a position and a size of the area. Consequently, it is possible to provide a device meeting a request of the user.

The imaging device according to another aspect of the presently disclosed subject matter may further include a size determining unit configured to determine a change amount of the size of the area according to a position of the focus lens, and the area changing unit may change the size of the area according to the change amount. Consequently, even if the size of the area (the contrast image) changes according to an object distance, it is possible to match the optical image and the contrast image.

An imaging method according to another aspect of the presently disclosed subject matter includes: a step of acquiring a taken image by imaging object light passed through an imaging optical system including a focus lens; a step of setting a manual focus mode for moving the focus lens according to an operation of an operation unit; a step of generating a contrast image, which is an image in which an edge of the taken image is enhanced or extracted; and a step of displaying, when the manual focus mode is set, the contrast image on a display unit on which a display content is superimposed on an optical image of an object in an optical finder.

An imaging method according to another aspect of the presently disclosed subject matter includes: a step of acquiring a taken image by imaging object light passed through an imaging optical system including a focus lens; a step of setting a manual focus mode for moving the focus lens according to an operation of an operation unit; a step of calculating a contrast evaluation value indicating an integrated value of a high-frequency component of the taken image concerning each of a plurality of areas in the taken image; a step of generating a contrast image, which is an image representing a magnitude of the contrast evaluation value, in each of the plurality of areas in the taken image; and a step of displaying, when the manual focus mode is set, the contrast image on a display unit on which a display content is superimposed on an optical image of an object in an optical finder.

A program according to another aspect of the presently disclosed subject matter causes an arithmetic unit to execute: a step of acquiring a taken image by imaging object light passed through an imaging optical system including a focus lens; a step of setting a manual focus mode for moving the focus lens according to an operation of an operation unit; a step of generating a contrast image, which is an image in which an edge of the taken image is enhanced or extracted; and a step of displaying, when the manual focus mode is set, the contrast image on a display unit on which a display content is superimposed on an optical image of an object in an optical finder.

A program according to another aspect of the presently disclosed subject matter causes an arithmetic unit to execute: a step of acquiring a taken image by imaging object light passed through an imaging optical system including a focus lens; a step of setting a manual focus mode for moving the focus lens according to an operation of an operation unit; a step of calculating a contrast evaluation value indicating an integrated value of a high-frequency component of the taken image concerning each of a plurality of areas in the taken image; a step of generating a contrast image, which is an image representing a magnitude of the contrast evaluation value, in each of the plurality of areas in the taken image; and a step of displaying, when the manual focus mode is set, the contrast image on a display unit on which a display content is superimposed on an optical image of an object in an optical finder.

According to the presently disclosed subject matter, in a camera in which an imaging optical system and a finder optical system are separately disposed, it is possible to perform a focusing operation in a manual focus without looking away from an optical finder while securing visibility unique to the optical finder.

DETAILED DESCRIPTION OF EXEMPLARY EMBODIMENTS

Embodiments for implementing an imaging device, an imaging method, a recording medium and a program according to the presently disclosed subject matter are described in detail below with reference to the accompanying drawings.

First Embodiment

Explanation of the Configuration of an Imaging Device

Figure 1:
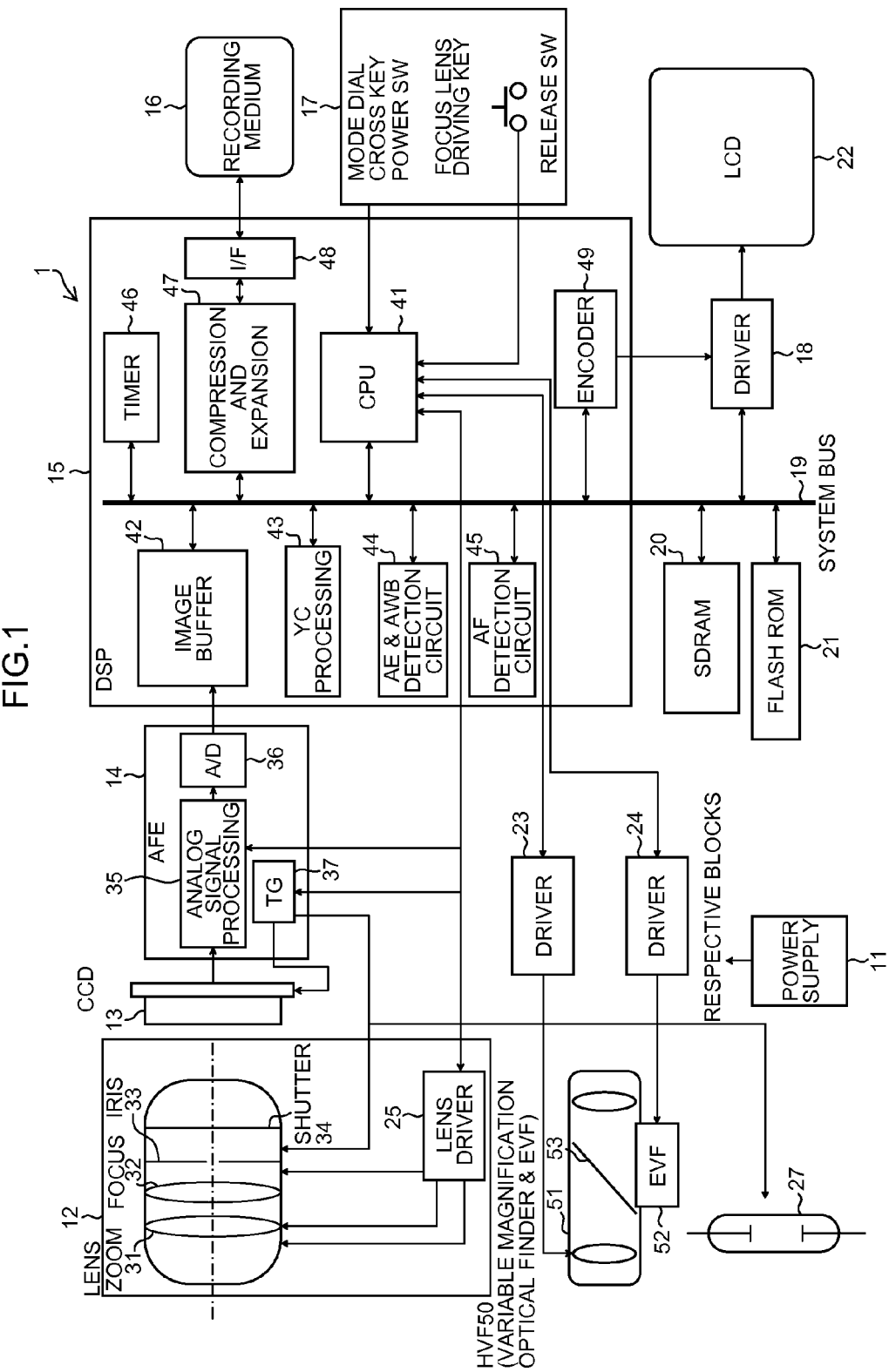
FIG. 1 is a block diagram of a digital camera according to a first embodiment.

FIG. 1 is a block diagram illustrating an internal configuration of a digital camera according to a first embodiment. The digital camera 1 receives, with an imaging element, light passed through a lens, converts the light into a digital signal, and records the digital signal in a storage medium 16. The entire operation of the digital camera 1 is collectively controlled by a central processing unit (CPU) 41.

As illustrated in FIG. 1, the digital camera 1 includes a power supply 11, an imaging optical system 12, an imaging element 13, an AFE (Analog Front End) 14, a DSP (Digital Signal Processor) 15, a recording medium 16, an operation unit 17, a display driver 18, a system bus 19, an SDRAM (Synchronous Dynamic Random Access Memory) 20, a flash ROM (Read-Only Memory) 21, a flash 27, a display unit (e.g., an LCD (Liquid Crystal Display)) 22, and a finder 50. The digital camera 1 includes a lens driver 25 for driving the imaging optical system 12 and drivers (23 and 24, respectively) for driving an optical finder 51 and an electronic view finder 52. The lens driver 25 and the drivers 23 and 24 are connected to serial input and output (I/O) terminals of the DSP 15.

The power supply 11 includes a battery and a power supply control unit not illustrated in the figure and performs power supply to the respective blocks of the digital camera 1. The respective blocks supplied with electric power are controlled by the CPU 41 included in the DSP 15 to operate. The CPU 41 executes a predetermined control program according to an input from the operation unit 17 and controls the respective sections of the digital camera 1.

The operation unit 17 includes a release switch, a mode dial, a cross key, a reproduction button, a MENU/OK key, and a BACK key, and the like. A signal from the operation unit 17 is input to the CPU 41, and the CPU 41 controls respective circuits of the digital camera 1 according to the input signal and performs, for example, lens driving control, aperture driving control, imaging operation control, image processing control, recording/reproduction control for image data, and display control for the LCD 22 capable of performing stereoscopic display.

The release switch is an operation button for inputting an instruction for an imaging start and is configured by a switch of a two-stage stroke type including an S1 switch that is turned on when half-pressed and an S2 switch that is turned on when full-pressed. The mode dial is selecting means for selecting a 2D imaging mode, a 3D imaging mode, an auto imaging mode, a manual imaging mode, scene positions for a person, a landscape, a night view, and the like, a macro mode, a moving image mode, and a parallax preference imaging mode.

The reproduction button is a button for switching to a reproduction mode for causing the LCD 22 to display a taken and recorded still image or moving image of a stereoscopic image (3D image) or a plane image (2D image). The MENU/OK key is an operation key including both of a function of a menu button for performing a command for causing the LCD 22 to display a menu on a screen of the LCD 22 and a function of an OK button for commanding decision, execution, and the like of selected content. The cross key is an operation unit for inputting indication of up, down, left, and right four directions and functions as a button (cursor moving operation means) for selecting an item from a menu screen and instructing selection of various setting items from respective menus. Up/down keys of the cross key function as a zoom switch during imaging or a reproduction zoom switch during the reproduction mode. Left/right keys function as a frame advance (forward/backward advance) button during the reproduction mode. The BACK key is used for erasing of a desired target such as a selected item and cancellation of instruction content or, for example, when an operation state is returned to the immediately preceding operation state.

In the flash ROM 21, a control program to be executed by the CPU 41, various parameters necessary for control, pixel defect data of the imaging element (the CCD (Charge Coupled Device)) 13, and the like are recorded. The CPU 41 reads out the control program recorded in the flash ROM 21 to the SDRAM 20 and successively executes the control program to control the respective sections of the digital camera 1. Note that the SDRAM 20 is used as an execution processing area for a program. The SDRAM 20 is used as a temporary storage area for image data and the like and various work areas.

The imaging optical system 12 includes a zoom lens 31, a focus lens 32, an iris 33, and a shutter 34. The zoom lens 31, the focus lens 32, the iris 33, and the shutter 34 are respectively driven by the lens driver 25 according to commands of the CPU 41.

The zoom lens 31 and the focus lens 32 move back and forth on the same optical axis and perform zooming and focusing.

The iris 33 controls an amount of light made incident on the CCD 13 and performs control of shutter speed and exposure. The iris 33 consists of, for example, five diaphragm blades and is subjected to diaphragm control in six stages from an aperture value F1.4 to an aperture value F11 at an interval of 1 AV.

The shutter 34 operates to make object light passed through the zoom lens 31, the focus lens 32, and the iris 33 incident on the CCD 13 for a predetermined time.

The CCD 13 is arranged in a post stage of the shutter 34 and receives object light passed through the imaging optical system 12. The CCD 13 includes a light receiving surface on which a large number of light receiving elements are arrayed in a matrix shape as it is well known. The object light passed through the imaging optical system 12 is imaged on the light receiving surface of the CCD 13 and converted into an electric signal by the respective light receiving elements. Note that a type of the imaging element is not limited to the CCD. As the imaging element, other image sensors such as a CMOS (Complementary Metal Oxide Semiconductor) are also applicable.

The AFE 14 includes an analog signal processing unit 35, an A/D converter 36, and a timing generator (TG) 37. The CCD 13 outputs charges accumulated in respective pixels line by line as a serial image signal in synchronization with a vertical transfer clock and a horizontal transfer clock supplied from the timing generator 37. The CPU 41 controls the timing generator 37 and controls the driving of the CCD 13.

Note that a charge accumulation time (an exposure time) of the pixels is determined by an electronic shutter driving signal given from the timing generator 37. The CPU 41 instructs the timing generator 37 about the charge accumulation time.

The output of the image signal is started when the digital camera 1 is set in an imaging mode. That is, when the digital camera 1 is set in the imaging mode, in order to display a live view image (a through image) on the LCD 22, the output of the image signal is started. The output of the image signal for the through image is once stopped when an instruction for main imaging is performed. The output of the image signal for the through image is started again when the main imaging ends.

The image signal output from the CCD 13 is an analog signal. The analog image signal is captured into the analog signal processing unit 35.

The analog signal processing unit 35 includes a correlated double sampling circuit (CDS) and an automatic gain control circuit (AGC). The CDS performs removal of noise included in the image signal. The AGC amplifies the image signal subjected to the noise removal with a predetermined gain. The analog image signal subjected to required signal processing by the analog signal processing unit 35 is captured into the A/D converter 36.

The A/D converter 36 converts the captured analog image signal into a digital image signal having gradation width of predetermined bits. The image signal is so-called RAW data and has gradation values indicating concentrations of R (red), G (green), and B (blue) for each of pixels. The digital image signal is captured into the DSP 15.

The DSP 15 includes the CPU 41 explained above, an image buffer 42, a YC processing unit 43, an AE/AWB detection circuit 44, an AF detection circuit 45, a timer 46, a compressing and expanding unit 47, a recording medium interface (I/F) 48, and a video encoder 49. These are connected to a system bus 19 and can transmit and receive information to one another via the system bus 19.

The image buffer 42 stores image signals for one frame captured from the A/D converter 36.

The AF detection circuit 45 captures image signals of R, G, and B stored in the image buffer 42 and calculates a focus evaluation value necessary for AF (Automatic Focus) control according to a command of the CPU 41. The AF detection circuit 45 includes a high-pass filter configured to allow only a high-frequency component of a G signal to pass, an absolute value processing unit, an AF area extracting unit configured to slice out a signal in a predetermined focus area (hereinafter referred to as AF area) set on a screen, and an integrating unit configured to integrate absolute value data in the AF area. The AF detection circuit 45 outputs the absolute value data in the AF area integrated by the integrating unit to the CPU 41 as a focus evaluation value. As a control system for a focus lens group based on the focus evaluation value, it is possible to use a system for searching for a position where the focus evaluation value is maximal and moving the focus lens 32 to the position and a mountain climbing system for moving the focus lens group in a direction in which the focus evaluation value increases and, when a point where the focus evaluation value starts to decrease is detected, setting the focus lens group in the position.

The AE/AWB detection circuit 44 captures the image signals of R, G, and B stored in the image buffer 42, integrates the G signal of the entire screen or integrates the G signal weighted differently in a screen center portion and a peripheral portion, and outputs an integrated value necessary for AE control of the G signal to the CPU 41. The CPU 41 calculates a luminance value from the integrated value and calculates an exposure value from the luminance value. The CPU 41 determines an aperture value and shutter speed from the exposure value according to a predetermined program diagram.

The AE/AWB detection circuit 44 divides one screen into a plurality of areas (e.g., 16×16) and calculates average integrated values by colors of the image signals of R, G, and B for each of the divided areas as physical quantities necessary for AWB control. The CPU 41 calculates ratios of R/G and B/G for each of the divided areas from the obtained integrated value of R, integrated value of B, and integrated value of G and performs light source type discrimination on the basis of a distribution in a color space of R/G and B/G of calculated values of R/G and B/G or the like. The CPU 41 determines gain values (white balance correction values) for R, G, and B signals of a white balance adjustment circuit according to a white balance adjustment value suitable for the discriminated light source type such that, for example, values of the ratios are about 1 (i.e., an integration ratio of RGB is R:G:B=1:1:1 on one screen). The AE/AWB detection circuit 44 applies a digital gain corresponding to the light source type to the image signals for one frame stored in the image buffer 42 to perform white balance adjustment and perform gamma (gradation characteristic) processing and sharpness processing.

The YC processing unit 43 applies predetermined signal processing to the image signals of the respective colors of R, G, and B captured in a point sequential manner and generates an image signal (a Y/C signal) including a luminance signal Y and color difference signals Cr and Cb. The Y/C signal is stored in the SDRAM 20.

The compressing and expanding unit 47 applies compression processing of a predetermined format (e.g., JPEG (Joint Photographic Experts Group)) to the input Y/C signal according to a compression command from the CPU 41 and generates compressed image data. The compressing and expanding unit 47 applies expansion processing of a predetermined format to the input compressed image data according to an expansion command from the CPU 41 and generates uncompressed image data.

The video encoder 49 controls display on the LCD 22 via the display driver 18 according to a command from the CPU 41.

The LCD 22 can display a moving image (a through image) and can be used as an electronic view finder, and the LCD 22 can also display a taken image before recording (a preview image), a reproduced image read out from the recording medium 16 inserted in the digital camera 1, or the like. The LCD 22 displays, according to operation of the mode dial or the menu button, various menu screens in manually setting an operation mode of the digital camera 1, white balance, the number of pixels of an image, and sensitivity and displays a screen for a graphical user interface (GUI) capable of setting manual setting items according to the operation of the operation unit 17.

The recording medium interface 48 controls reading of data from and writing of data in the recording medium 16 according to a command from the CPU 41. Note that the recording medium 16 may be a recording medium detachably attached to a camera main body like a memory card or may be a recording medium incorporated in the camera main body. When the recording medium 16 is detachably attached, a card slot is provided in the main body of the digital camera 1. The recording medium 16 is inserted into the card slot and used.

The timer 46 performs measurement of a timer time in a self timer mode and performs measurement of a repetition time of finder display processing (described in detail below).

A finder 50 (HVF) includes the optical finder 51, the electronic view finder (EVF) 52, and a prism 53. The user can visually recognize an optical image of the optical finder 51 and an electronic image of the electronic view finder 52 via one eyepiece unit.

The optical finder 51 is a variable magnification optical finder capable of changing a magnification in a stepwise manner according to magnification variation of the imaging optical system 12. The optical finder 51 includes a finder optical system including an objective lens, an eyepiece, and two insertion lenses provided therebetween and disposed to be capable of advancing into and retracting from an optical path of the optical finder 51. When one insertion lens is inserted into the optical path according to an instruction of the CPU 41, the magnification of the optical finder 51 (hereinafter referred to as finder magnification) is changed from ×1 to ×2. Further, when one more insertion lens is inserted into the optical path, the finder magnification is changed from ×2 to ×3. Note that the configuration of the lenses included in the optical finder 51 and a form of magnification control are not limited to the above.

The electronic view finder 52 includes a display unit (e.g., a liquid crystal panel). Display of the electronic view finder 52 is guided to the eyepiece unit of the optical finder 51 by the prism 53 disposed in the optical path of the optical finder 51.

[Description of the Operation of the Imaging Device]

Next, the operation of the digital camera 1 is explained. This imaging processing is controlled by the CPU 41. A program for causing the CPU 41 to execute the imaging processing is stored in, for example, a program storing unit in the CPU 41.

Object light passed through the respective lenses 31 and 32 of the imaging optical system 12 is imaged on the light receiving surface of the CCD 13 via the iris 33. Signal charges accumulated in the respective pixels of the CCD 13 are sequentially read out at a predetermined frame rate as a voltage signal (an image signal) corresponding to the signal charges according to horizontal and vertical transfer clocks received from the timing generator 37, and image data is sequentially generated. The generated image data is sequentially input to the SDRAM 20.

The CPU 41 changes an opening amount (an F value) of the iris 33 on the basis of the image data. The CPU 41 moves the zoom lens 31 along an optical axis via the lens driver 25 and performs zooming according to an input from the operation unit 17.

When the release switch is half-pressed, the S1 ON signal is input to the CPU 41. The CPU 41 carries out AE/AF/AWB operations via the AF detection circuit 45 and the AE/AWB detection circuit 44.

On the basis of an input from the operation unit 17, the digital camera 1 can be set in a manual focus mode for not performing the AF operation. In the manual focus mode, the user instructs movement of the focus lens 32 via the operation unit 17 (a focus lens driving key, etc.), whereby the focus lens 32 is moved. Therefore, in the manual focus mode, it is desired that the user checks a focus state.

Figure 2:
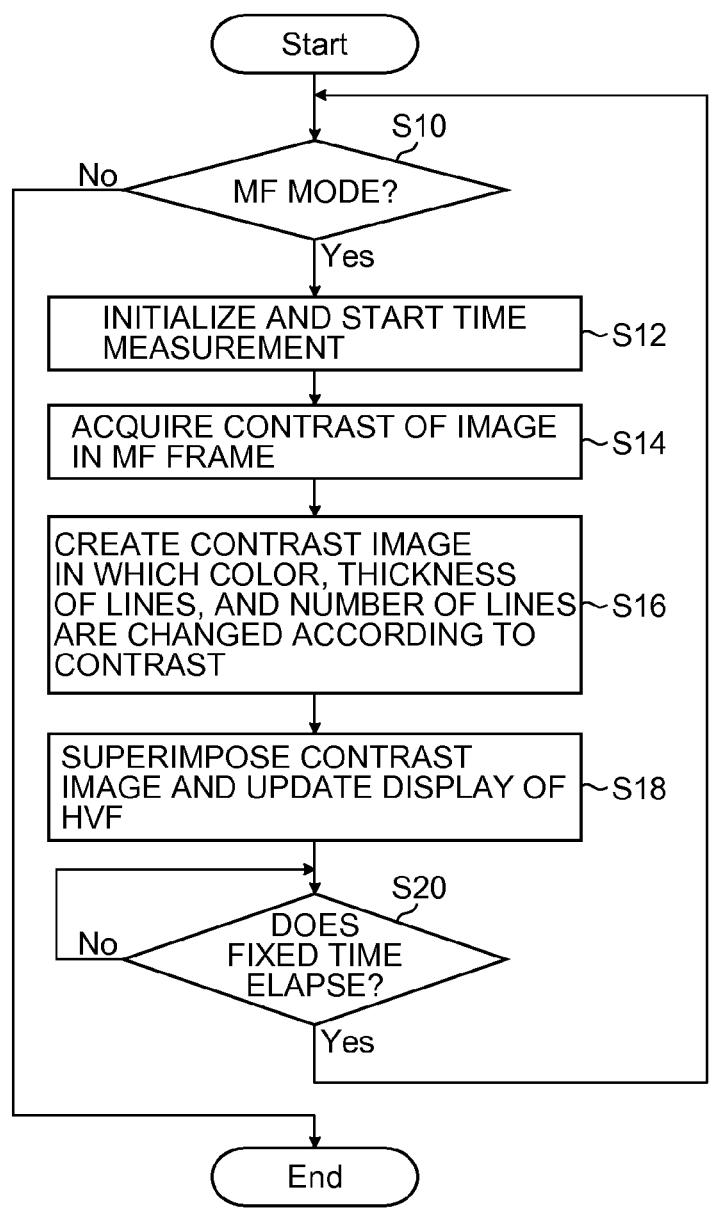
FIG. 2 is a flowchart illustrating a flow of finder display processing at the time when a manual focus mode is set in the first embodiment.

FIG. 2 is a flowchart illustrating a flow of finder display processing at the time when the manual focus mode (MF mode) is set. This processing is mainly performed by the CPU 41.

The CPU 41 determines whether the digital camera 1 is set in the MF mode (step S10). When the MF mode is not set (NO in step S10), the processing ends.

When the MF mode is set (YES in step S10), in order to periodically update finder display, the CPU 41 initializes and activates the timer 46 (step S12).

Figure 3:
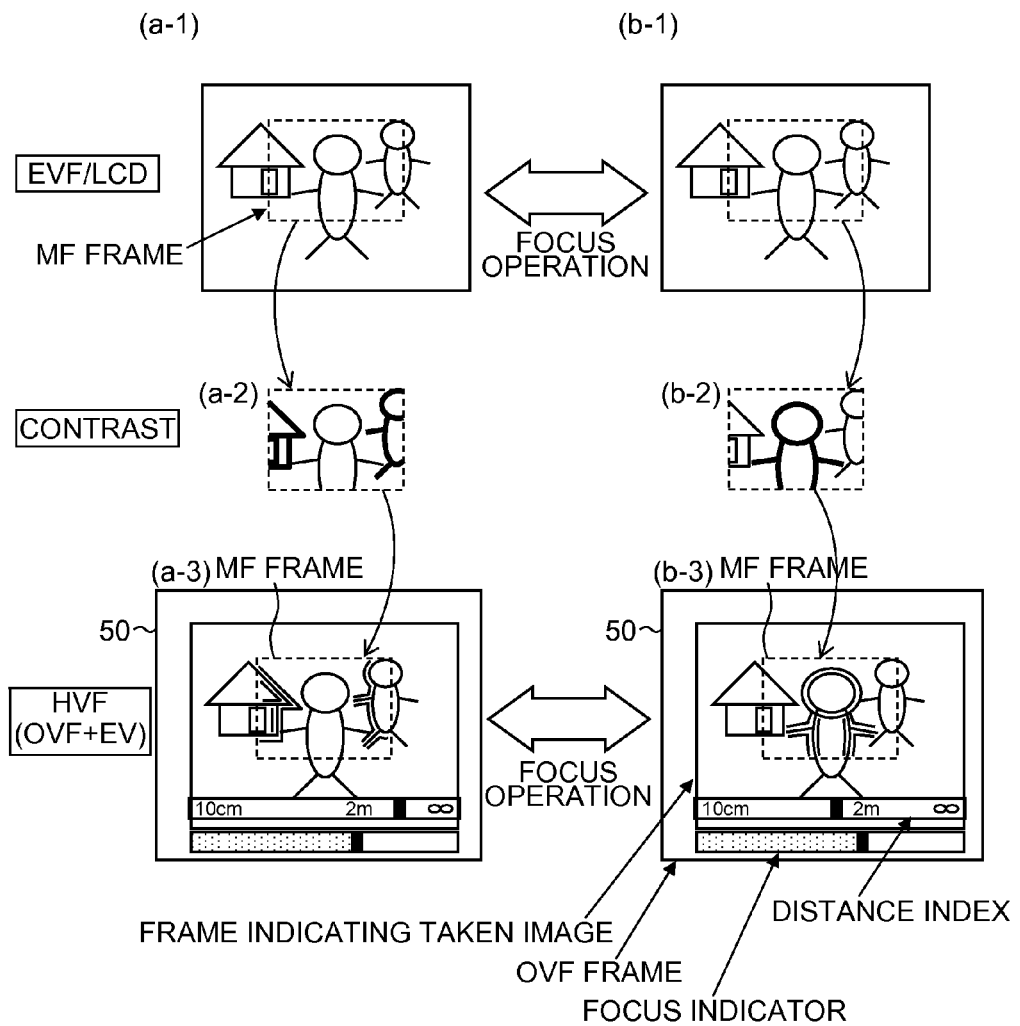
FIG. 3 is a diagram illustrating an image of display of a finder.

The CPU 41 divides an MF frame (see an (a-1) portion and a (b-1) portion of FIG. 3) set in image data into a plurality of areas and inputs the image data to the AF detection circuit 45. The AF detection circuit 45 calculates a contrast evaluation value for each of the areas and inputs the contrast evaluation value to the CPU 41 (step S14). As in a method of calculating a focus evaluation value used in contrast AF, the contrast evaluation value can be calculated by causing each of the divided areas to pass through a high-pass filter and converting the intensity of contrast into a numerical value. The MF frame is initially set to a predetermined size. However, the user can change the size and the position of the MF frame via the operation unit 17.

The CPU 41 generates an image (a contrast image) indicating which part is focused with respect to the image data in the MF frame set in the image data (step S16). Specifically, first, the CPU 41 applies the high-pass filter to the image data in the MF frame set in the image data and leaves only a high-frequency component to generate an image (an edge image) in which an area with high contrast, that is, an edge is enhanced. The CPU 41 changes a color, thickness, and a number of lines of the edge image according to the contrast evaluation value calculated for each of the areas in step S14.

When focused, the contrast evaluation value becomes higher. Therefore, the CPU 41 thickens lines in an area of the edge image with the higher contrast evaluation value and thins lines as the contrast evaluation value decreases. The CPU 41 colors the lines of the area of the edge image with the higher contrast evaluation value in red and colors the lines in the area of the edge image with the lower contrast evaluation value in blue. Note that, when the contrast evaluation value is intermediate, the colors of red and blue may be shaded or an intermediate color may be used.

When the digital camera 1 is focused on an object in a far side as illustrated in an (a-1) portion of FIG. 3, as illustrated in an (a-2) portion of FIG. 3, in a contrast image, lines of the objects in the farther side are represented in thicker and blue and lines of an object in a nearer side are represented in thinner and red. When the digital camera 1 is focused on the object in the near side as illustrated in a (b-1) portion of FIG. 3, as illustrated in a (b-2) portion of FIG. 3, in the contrast image, the lines of the object in the nearer side are represented in thicker and blue and the lines of the objects in the farther side are represented in thinner and red.

The CPU 41 displays the contrast image generated in step S16 on the electronic view finder 52. Consequently, display of the finder 50 changes to display in which the contrast image is superimposed and displayed on the optical image of the optical finder 51 (step S18). An (a-3) portion and a (b-3) portion of FIG. 3 are display examples of the finder 50 at the time when the contrast image is superimposed and displayed on the optical image. Since the lines look thicker and blue in the focused object in the optical image by superimposing and displaying the contrast image, it is possible to check a focused position while looking at the optical image. Note that, although, in the (a-3) portion and the (b-3) portion of FIG. 3, a frame indicating a taken image, a distance index indicating a distance to the focused object, and a focus indicator indicating an optimum point of focus and a state of focus are displayed on the electronic view finder 52, the display of the distance index and the focus indicator are not essential. Although the distance index and the focus indicator are displayed below the frame indicating the taken image, a position where the distance index and the focus indicator are displayed is not limited to this.

The CPU 41 determines whether a predetermined time (a fixed time) elapses after the timer 46 is initialized and activated in step S12 (step S20). When the predetermined time does not elapse (NO in step S20), the step S20 is performed again. When the predetermined time elapses (YES in step S20), the CPU 41 returns to step S10. The CPU 41 repeatedly performs the finder display processing at the time when the MF mode is set (steps S10 to S20).

The finder display processing at the time when the MF mode is set is finished when the auto focus mode for performing the AF operation is set by the operation unit 17 or when the release switch is full-pressed.

When the release switch is fully pressed, an S2 ON signal is input to the CPU 41, and imaging and recording processing starts. That is, the CPU 41 exposes the CCD 13 at shutter speed and an aperture value determined on the basis of a photometry result.

Image data output from the CCD 13 is captured into the YC processing unit 43 via the AFE 14 and a luminance/color difference signal (a Y/C signal) is generated, and the image data is stored in the SDRAM 20 after being compressed according to a predetermined compression format (e.g., a JPEG format) by the compressing and expanding unit 47.

A JPEG file is generated from the compressed data stored in the SDRAM 20. The JPEG file is recorded in the recording medium 16 via the recording medium interface 48. Consequently, an image is taken and recorded.

The image recorded in the recording medium 16 as explained above can be reproduced and displayed on the LCD 22 by setting an operation mode of the digital camera 1 to the reproduction mode with the reproduction button.

When the reproduction mode is set, the CPU 41 outputs a command to the recording medium interface 48 and causes the recording medium interface 48 to read out an image file recorded in the recording medium 16 last.

Compressed image data of the read-out image file is added to the compressing and expanding unit 47 and output to the LCD 22 via the video encoder 49 after being expanded to an uncompressed luminance/color difference signal.

Frame advance of an image is performed by the left and right key operation of the cross key. When the right key of the cross key is pressed, the next image file is read out from the recording medium 16 and reproduced and displayed on the LCD 22. When the left key of the cross key is pressed, the immediately preceding image file is read out from the recording medium 16 and reproduced and displayed on the LCD 22.

According to this embodiment, it is possible to check a focused position on a display of the optical finder. Therefore, it is possible to reduce annoyance of switching operation from the optical finder to the electronic view finder and looking away from the optical finder and looking at the liquid crystal monitor. It is possible to secure visibility without reducing finder coverage of the optical finder.

Note that, although, in this embodiment, the digital camera in which the imaging optical system 12 can be replaced is explained as an example, the presently disclosed subject matter is not limited to this. This embodiment is also applicable to a digital camera of a lens integrated type.

In this embodiment, the contrast image is generated for the image data in the MF frame and superimposed and displayed on the optical image. However, a contrast image may be generated for an entire screen of the image data and superimposed and displayed on the optical image.

In this embodiment, the timer 46 is initialized and activated in step S12 and it is determined in step S20 whether the predetermined time elapses from step S12 to periodically update the finder display. However, a method of periodically updating the finder display is not limited to this. For example, the processing in steps S10 and S14 to S18 may be repeatedly performed at timing (e.g., 30 frames) for acquiring an output image from the CCD 16 without using the timer 46.

In this embodiment, the edge image in which only the high-frequency component is left is generated in step S16 and the edge enhancement processing is applied to the edge image to generate the contrast image. However, the edge enhancement processing is not essential. For example, an edge image obtained by extracting an edge only in a focused area may be generated as a contrast image.

Second Embodiment

The first embodiment of the presently disclosed subject matter is a form for generating a contrast image and superimposing and displaying the contrast image on an optical image. However, a method of enabling a check of a focused position on optical finder display is not limited to this.

A second embodiment of the presently disclosed subject matter is a form for superimposing and displaying a contrast evaluation value on an optical image. A digital camera 1-1 according to the second embodiment is explained below. Note that explanation is omitted concerning portions same as the portions in the first embodiment.

Figure 4:
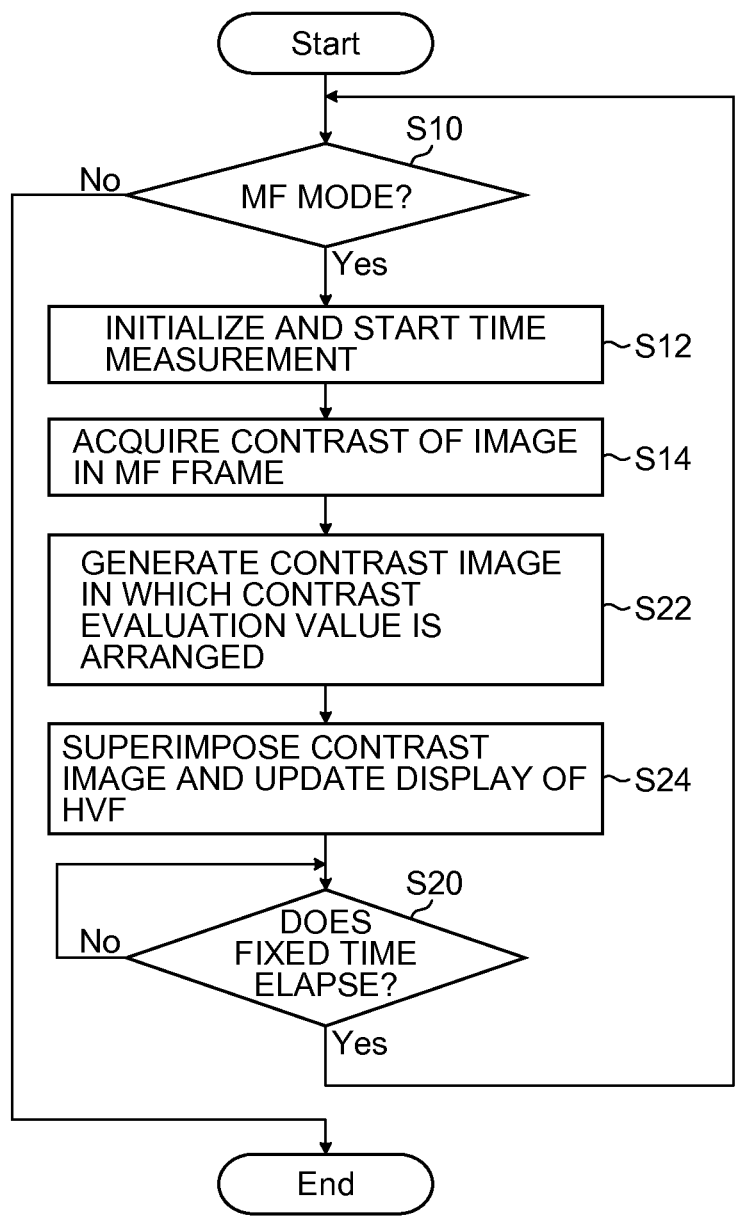
FIG. 4 is a flowchart illustrating a flow of finder display processing at the time when a manual focus mode is set in a second embodiment.

FIG. 4 is a flowchart illustrating a flow of finder display processing at the time when a manual focus mode is set. This processing is mainly performed by the CPU 41.

The CPU 41 determines whether the digital camera 1-1 is set in an MF mode (step S10). When the MF mode is not set (NO in step S10), the processing ends.

When the MF mode is set (YES in step S10), in order to periodically update finder display, the CPU 41 initializes and activates the timer 46 (step S12).

Figure 5:
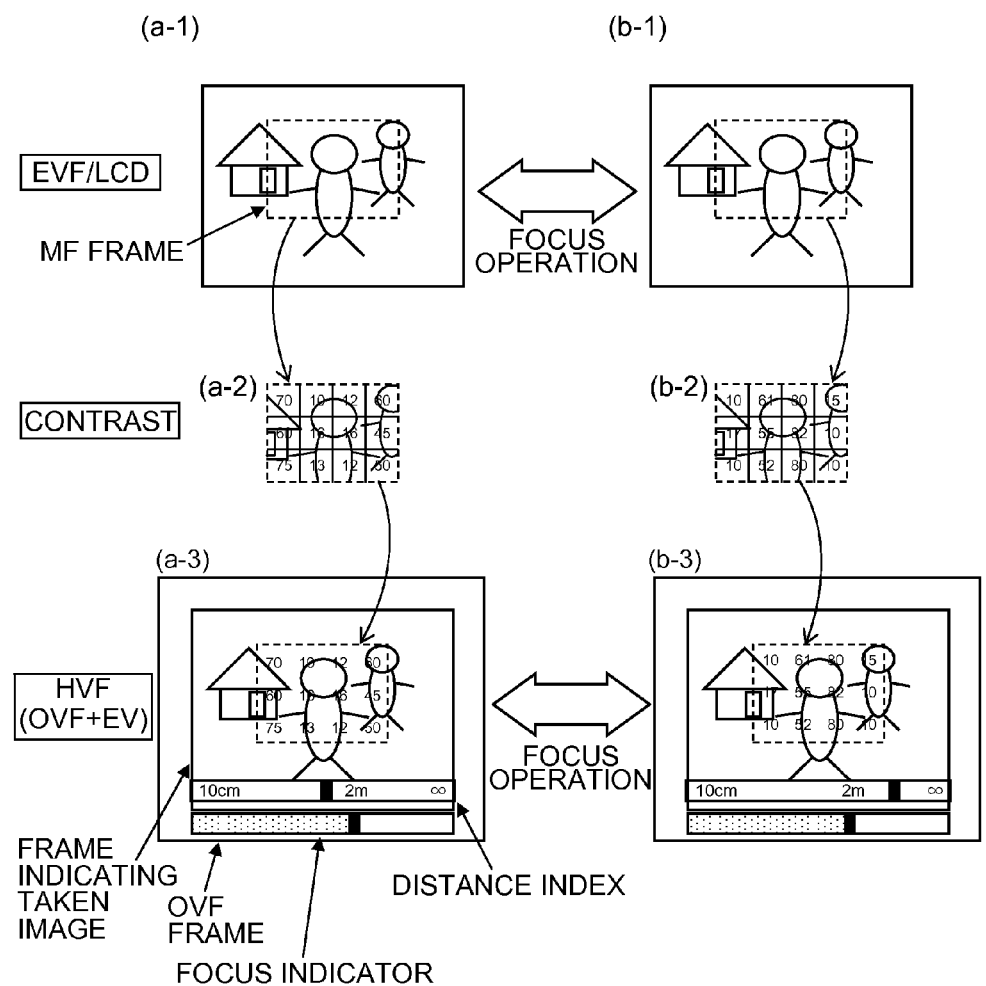
FIG. 5 is a diagram illustrating an image of display of a finder.

The CPU 41 divides an MF frame set in image data into a plurality of areas and inputs the image data to the AF detection circuit 45. The AF detection circuit 45 calculates a contrast evaluation value for each of the areas and inputs the contrast evaluation value to the CPU 41 (step S14). As illustrated in FIG. 5, in this embodiment, the CPU 41 divides the MF frame into sixteen areas.

The CPU 41 generates, as a contrast image, an image in which the contrast evaluation value calculated for each of the areas is arranged in a position corresponding to the area for which the contrast evaluation value is calculated (step S22).

When the digital camera 1-1 is focused on objects in a far side (objects located at both ends of an MF frame) as illustrated in an (a-1) portion of FIG. 5, as illustrated in an (a-2) portion of FIG. 5, numerical values displayed in positions equivalent to areas at both the ends of the MF frame are larger values and displayed in blue characters. Numerical values displayed in positions equivalent to an area (an unfocused object) in a center of the MF frame are smaller values and displayed in red characters. When the digital camera 1-1 is focused on an object in a near side (an object located in the center of the MF frame) as illustrated in a (b-1) portion of FIG. 5, as illustrated in a (b-2) portion of FIG. 5, numerical values displayed in the position equivalent to the area in the center of the MF frame are larger values and displayed in blue characters. Numerical values displayed in positions equivalent to the areas at both the ends of the MF frame (unfocused objects) are smaller values and displayed in red characters.

The CPU 41 displays the contrast image generated in step S22 on the electronic view finder 52. Consequently, display of the finder 50 changes to display in which the contrast image is superimposed and displayed on the optical image of the optical finder 51 (step S22). An (a-3) portion and a (b-3) portion of FIG. 5 are display examples of the finder 50 at the time when the contrast image is superimposed and displayed on the optical image. Since the contrast image is superimposed and displayed, large and blue numbers are superimposed and displayed on a focused object in the optical image. Therefore, a user can check a focused position while looking at the optical image.

The CPU 41 determines whether a predetermined time elapses after the timer 46 is initialized and activated in step S12 (step S20). When the predetermined time does not elapse (NO in step S20), the step S20 is performed again. When the predetermined time elapses (YES in step S20), the CPU 41 returns to step S10 and repeatedly performs the finder display processing (steps S10 to S20) at the time when the MF mode is set.

According to this embodiment, it is possible to check a focused position on optical finder display. Therefore, it is possible to reduce annoyance of switching operation from the optical finder to the electronic view finder and looking away from the optical finder and looking at the liquid crystal monitor. It is possible to secure visibility without reducing finder coverage of the optical finder.

Third Embodiment

In the first embodiment, the contrast image is always superimposed and displayed on the optical image in case of the manual focus mode. However, it is unnecessary to always superimpose and display the contrast image.

A third embodiment of the presently disclosed subject matter is a form for superimposing and displaying a contrast image on an optical image only when the focus lens 32 is being moved. A digital camera 1-2 according to the third embodiment is explained below. Note that explanation is omitted concerning portions same as the portions in the first and second embodiments.

Figure 6:
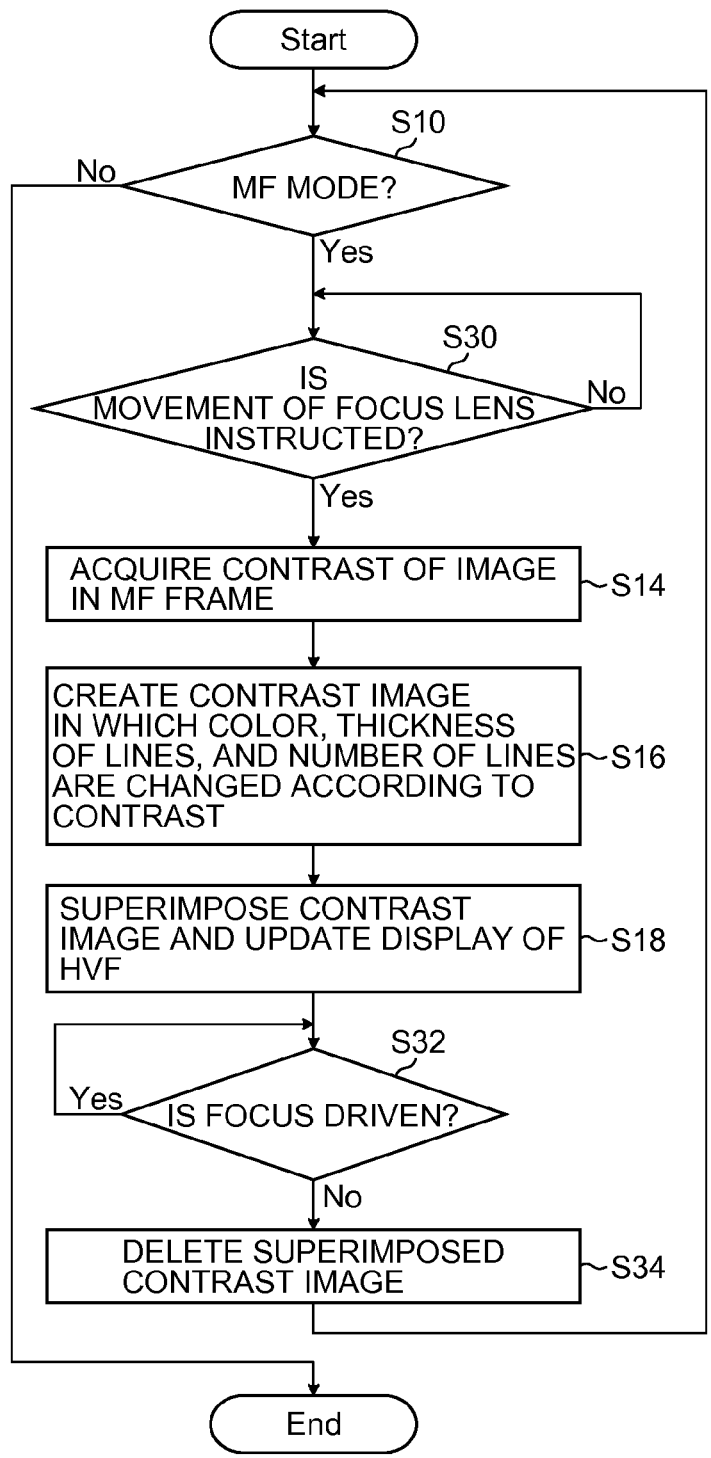
FIG. 6 is a flowchart illustrating a flow of finder display processing at the time when a manual focus mode is set in a third embodiment.

FIG. 6 is a flowchart illustrating a flow of finder display processing at the time when a manual focus mode is set. This processing is mainly performed by the CPU 41.

The CPU 41 determines whether the digital camera 1-2 is set in an MF mode (step S10). When the MF mode is not set (NO in step S10), the processing ends.

When the MF mode is set (YES in step S10), in order to periodically update finder display, the CPU 41 determines whether movement of the focus lens 32 is instructed via the operation unit 17, that is, whether the focus lens 32 moves (step S30).

When the focus lens 32 does not move (NO in step S30), step S30 is performed again.

When the focus lens 32 moves (YES in step S30), the CPU 41 divides an MF frame set in image data into a plurality of areas and inputs the image data to the AF detection circuit 45. The AF detection circuit 45 calculates a contrast evaluation value for each of the areas and inputs the contrast evaluation value to the CPU 41 (step S14).

The CPU 41 applies a high-pass filter to the image data in the MF frame set in the image data and generates an edge image, and the CPU 41 changes a color and thickness of lines of the edge image according to the contrast evaluation value calculated for each of the areas in step S14 and generates a contrast image (step S16).

The CPU 41 displays the contrast image generated in step S16 on the electronic view finder 52. Consequently, display of the finder 50 changes to display in which the contrast image is superimposed and displayed on the optical image of the optical finder 51 (step S18).

The CPU 41 determines whether the focus lens 32 is driven, that is, the movement of the focus lens 32 in the case of YES in step S30 continues (step S32). When the focus lens 32 is driven (YES in step S32), step S32 is repeated again. That is, when the focus lens 32 is driven, the superimposed display of the finder 50 performed in step S18 is continued.

When the focus lens 32 is not driven, that is, when the driving of the focus lens 32 ends (NO in step S32), the CPU 41 deletes the display of the contrast image of the electronic view finder 52 (step S34). As a result, only the optical image of the optical finder 51 is displayed on the finder 50. Therefore, in the manual focus mode, the contrast image is superimposed and displayed on the optical image only when a focus is adjusted.

According to this embodiment, since unnecessary focus information is deleted when a focus is not actually adjusted, it is possible to improve visibility of the optical finder.

Fourth Embodiment

In the third embodiment of the presently disclosed subject matter, a contrast image is superimposed and displayed on an optical image only while a focus lens is driven. This embodiment is an embodiment for meeting a request for checking a focused position after focus lens driving.

A fourth embodiment of the presently disclosed subject matter is a form for superimposing and displaying a contrast image on an optical image until a fixed time elapses after focus lens driving. A digital camera 1-3 according to the fourth embodiment is explained below. Note that explanation is omitted concerning portions same as the portions in the first to third embodiments.

Figure 7:
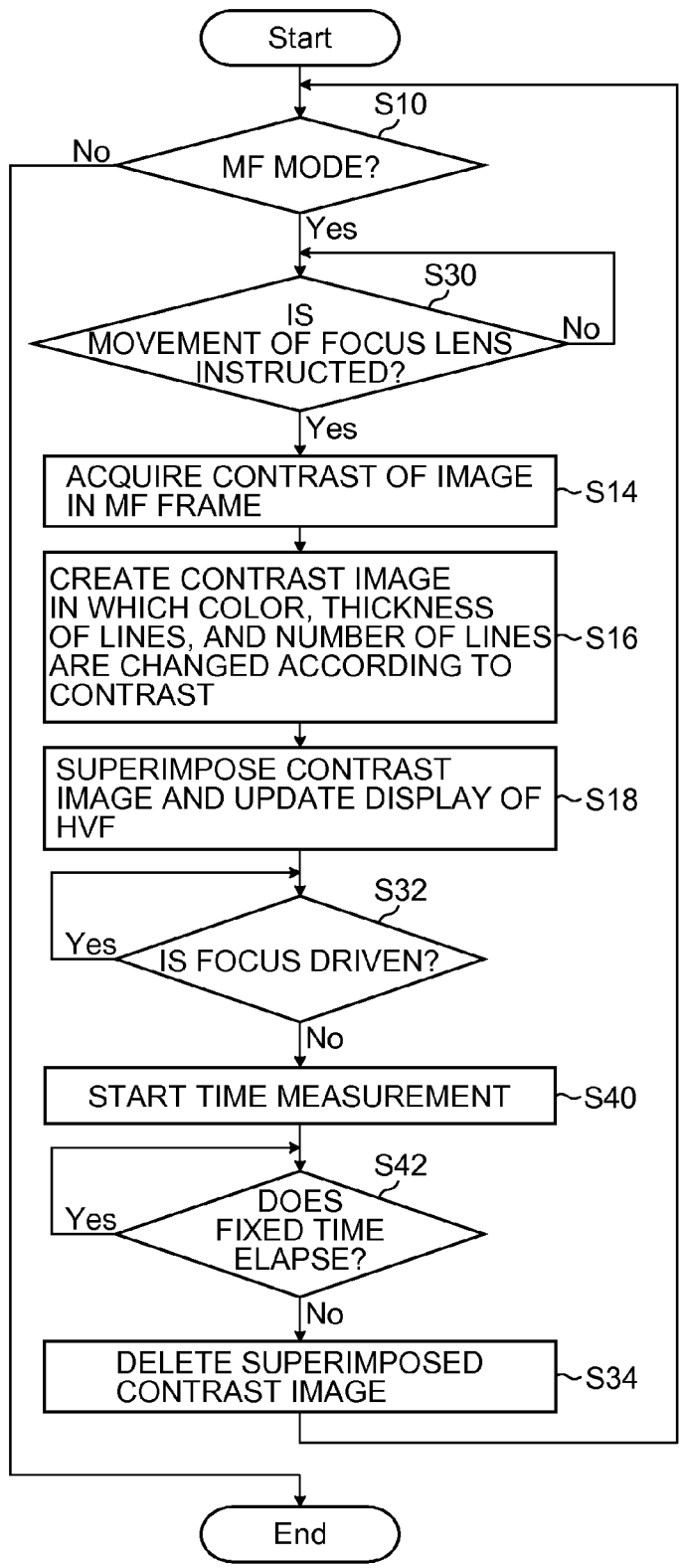
FIG. 7 is a flowchart illustrating a flow of finder display processing at the time when a manual focus mode is set in a fourth embodiment.

FIG. 7 is a flowchart illustrating a flow of finder display processing at the time when a manual focus mode is set. This processing is mainly performed by the CPU 41.

The CPU 41 determines whether the digital camera 1-3 is set in an MF mode (step S10). When the MF mode is not set (NO in step S10), the processing ends.

When the MF mode is set (YES in step S10), in order to periodically update finder display, the CPU 41 determines whether movement of the focus lens 32 is instructed via the operation unit 17 (step S30).

When the focus lens 32 is not moved (NO in step S30), step S30 is performed again.

When the focus lens 32 is moved (YES in step S30), the CPU 41 divides an MF frame set in image data into a plurality of areas and inputs the image data to the AF detection circuit 45. The AF detection circuit 45 calculates a contrast evaluation value for each of the areas and inputs the contrast evaluation value to the CPU 41 (step S14).

The CPU 41 applies a high-pass filter to the image data in the MF frame set in the image data and generates an edge image, and the CPU 41 changes a color and thickness of lines of the edge image according to the contrast evaluation value calculated for each of the areas in step S14 and generates a contrast image (step S16).

The CPU 41 displays the contrast image generated in step S16 on the electronic view finder 52. Consequently, display of the finder 50 changes to display in which the contrast image is superimposed and displayed on the optical image of the optical finder 51 (step S18).

The CPU 41 determines whether the focus lens 32 is driven (step S32). When the focus lens 32 is driven (YES in step S32), step S32 is repeated again. That is, when the focus lens 32 is driven, the superimposed display of the finder 50 performed in step S18 is continued.

When the focus lens 32 is not driven, that is, when the driving of the focus lens 32 ends (NO in step S32), the CPU 41 activates the timer 46 and starts time measurement (step S40). The CPU 41 determines whether a fixed time elapses after the timer 46 is activated in step S40 (step S42). When the fixed time does not elapse (NO in step S42), step S42 is repeated until the fixed time elapses.

When the fixed time elapses (YES in step S42), the CPU 41 deletes the display of the contrast image on the electronic view finder 52 (step S34). As a result, only the optical image of the optical finder 51 is displayed on the finder 50. That is, the contrast image is superimposed and displayed on the optical image of the optical finder 51 while the focus lens 32 is being moved and until a fixed time lapses after the focus lens 32 is stopped.

According to this embodiment, focus information is superimposed and displayed on the optical image only when a focus is adjusted in the manual focus mode, and when the focus information is unnecessary, the focus information is deleted. Therefore, it is possible to improve visibility of the optical finder. Since the focus information is displayed for a fixed time even after the focus adjustment, a user can check whether a target object is in-focus.

Fifth Embodiment

The first embodiment of the presently disclosed subject matter is a form for superimposing and displaying the contrast image on the optical image of the optical finder. However, it is also possible that, depending on the brightness of the optical image, the contrast image is difficult to see.

A fifth embodiment of the presently disclosed subject matter is a form for changing the transmittance of an optical image according to the brightness of the optical image. A digital camera 1-4 according to the fifth embodiment is explained below. Note that explanation is omitted concerning portions same as the portions in the first to fourth embodiments.

Figure 8:
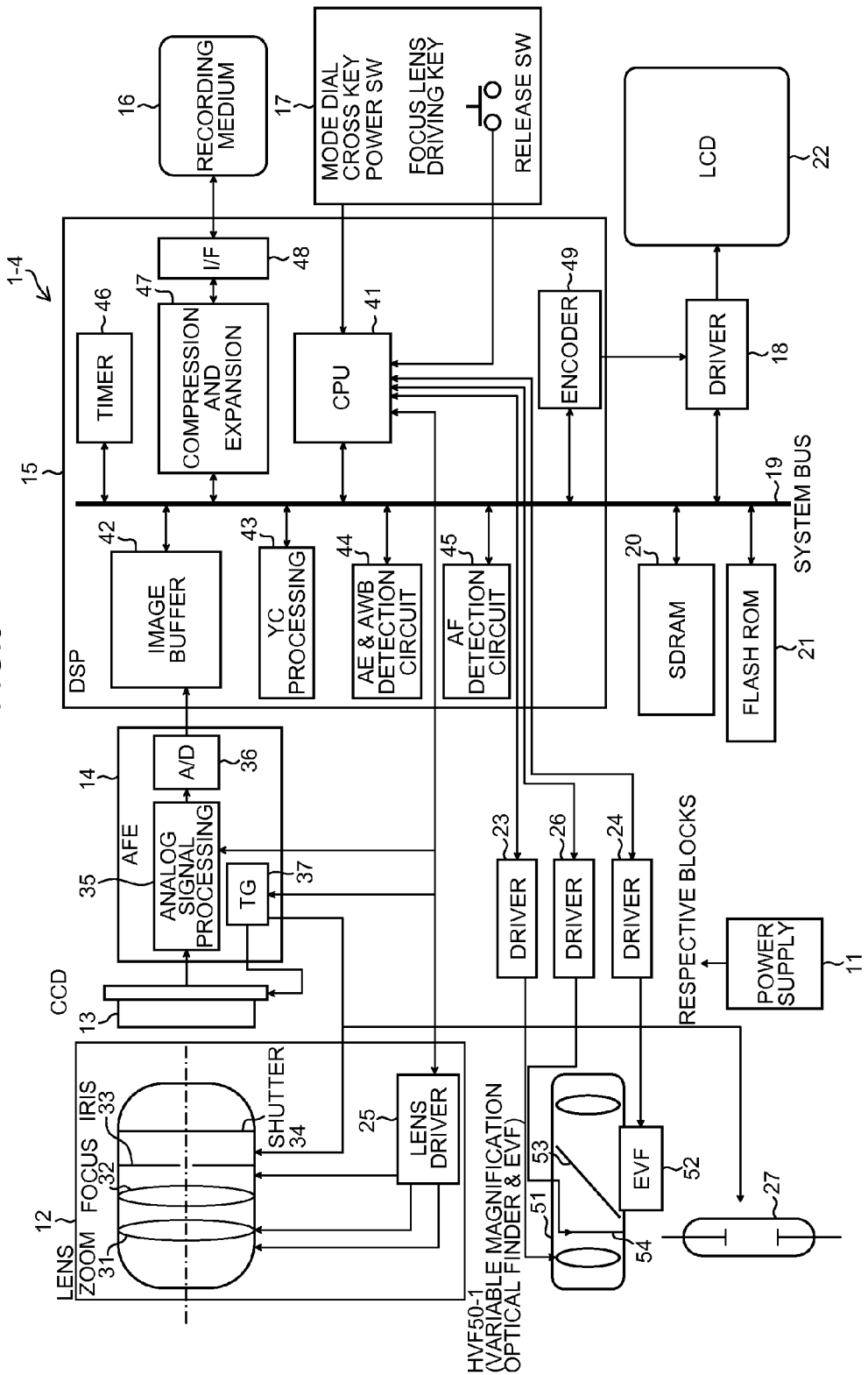
FIG. 8 is a block diagram of a digital camera according to a fifth embodiment.

FIG. 8 is a block diagram illustrating an internal configuration of the digital camera according to the fifth embodiment. The digital camera 1-4 receives, with an imaging element, light passed through a lens, converts the light into a digital signal, and records the digital signal in the recording medium 16. The operation of the entire digital camera 1-4 is collectively controlled by the central processing unit (CPU) 41.

As illustrated in FIG. 8, the digital camera 1-4 includes the power supply 11, the imaging optical system 12, the imaging element 13, the AFE 14, the DSP 15, the recording medium 16, the operation unit 17, the display driver 18, the system bus 19, the SDRAM 20, the flash ROM 21, the flash 27, the LCD 22, and a finder 50-1. The digital camera 1-4 includes the lens driver 25 and the drivers 23, 24, and 26 for driving the imaging optical system 12, the optical finder 51, the electronic view finder 52, and an ND filter 54. The lens driver 25 and the drivers 23, 24, and 26 are connected to a serial I/O terminal of the DSP 15.

The finder 50-1 includes the optical finder 51, the electronic view finder 52, the prism 53, and the neutral density filter (ND filter) 54. A user can visually recognize an optical image of the optical finder 51 and an electronic image of the electronic view finder 52 via one eyepiece unit.

The ND filter 54 is a filter configured to reduce an amount of light made incident on an eyepiece lens of the optical finder 51, and the ND filter 54 is disposed to be capable of advancing and retracting on an objective lens side with respect to the prism 53 in an optical path of the optical finder 51. The ND filter 54 is inserted into and removed from the optical path by being driven via the driver 26 according to an instruction of the CPU 41. When the ND filter 54 is inserted into the optical path, a light amount of the electronic view finder 52 does not change and only a light amount of the optical image decreases. As a result, the transmittance of the optical finder 51 in the finder 50-1 decreases.

Figure 9:
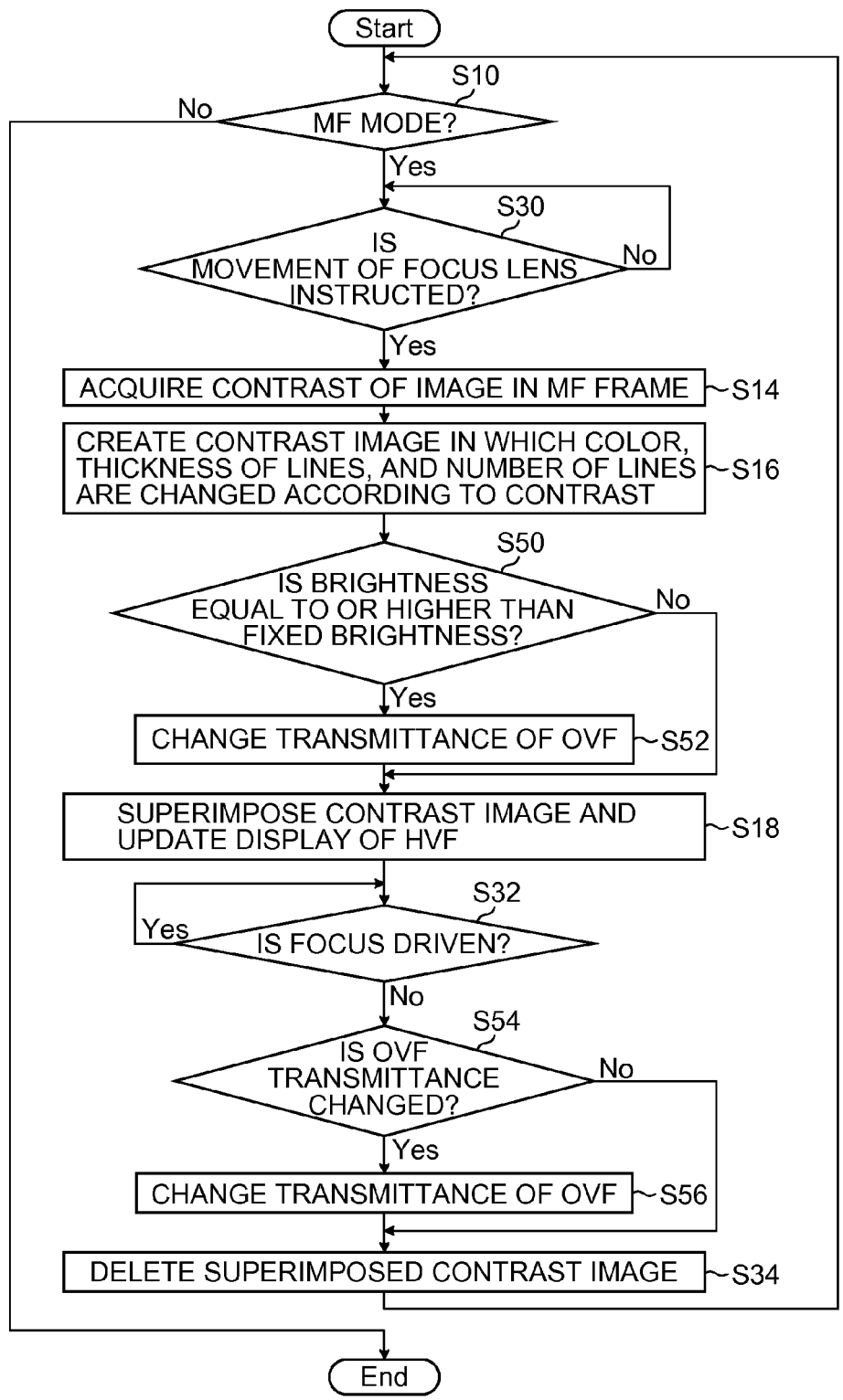
FIG. 9 is a flowchart illustrating a flow of finder display processing at the time when a manual focus mode is set in a fifth embodiment.

FIG. 9 is a flowchart illustrating a flow of finder display processing at the time when a manual focus mode is set. This processing is mainly performed by the CPU 41.

The CPU 41 determines whether the digital camera 1-4 is set in an MF mode (step S10). When the MF mode is not set (NO in step S10), the processing ends.

When the MF mode is set (YES in step S10), in order to periodically update finder display, the CPU 41 determines whether movement of the focus lens 32 is instructed via the operation unit 17 (step S30).

When the focus lens 32 is not moved (NO in step S30), step S30 is performed again.

When the focus lens 32 is moved (YES in step S30), the CPU 41 divides an MF frame set in image data into a plurality of areas and inputs the image data to the AF detection circuit 45. The AF detection circuit 45 calculates a contrast evaluation value for each of the areas and inputs the contrast evaluation value to the CPU 41 (step S14).

The CPU 41 applies a high-pass filter to the image data in the MF frame set in the image data to generate an edge image, and the CPU 41 changes a color and thickness of lines of the edge image according to the contrast evaluation value calculated for each of the areas in step S14 to generate a contrast image (step S16).

The CPU 41 determines whether the brightness of an object is equal to or higher than fixed brightness (step S50). For detection of the brightness of the object, an integrated value calculated by the AE/AWB detection circuit 44 can be used.

When the brightness of the object is equal to or higher than the fixed brightness (YES in step S50), the CPU 41 inserts the ND filter 54 into the optical path of the optical finder 51 via the driver 26 and reduces the transmittance of the optical finder 51 (step S52).

When the brightness of the object is not equal to or higher than the fixed brightness (NO in step S50) and when the transmittance of the optical finder 51 is reduced (step S52), the CPU 41 displays the contrast image generated in step S16 on the electronic view finder 52. Consequently, display of the finder 50-1 changes to display in which the contrast image is superimposed and displayed on the optical image of the optical finder 51 (step S18).

The CPU 41 determines whether the focus lens 32 is driven (step S32). When the focus lens 32 is driven (YES in step S32), step S32 is repeated again. That is, when the focus lens 32 is driven, the superimposed display of the finder 50-1 performed in step S18 is continued.

When the focus lens 32 is not driven, that is, when the driving of the focus lens 32 ends (NO in step S32), the CPU 41 determines whether the transmittance of the optical finder 51 is reduced in step S52 (step S54). When the transmittance of the optical finder 51 is reduced (YES in step S54), the CPU 41 removes the ND filter 54 from the optical path of the optical finder 51 to the outside via the driver 26 and resets the transmittance of the optical finder 51 (step S56).

When the transmittance of the optical finder 51 is not reduced (NO in step S54) and when the transmittance of the optical finder 51 is reset (step S56), the CPU 41 deletes the display of the contrast image of the electronic view finder 52 (step S34). As a result, only the optical image of the optical finder 51 is displayed on the finder 50-1.

According to this embodiment, since the optical image of the optical finder is bright, it is possible to prevent focus indication displayed on the electronic view finder from becoming difficult to see. Therefore, it is possible to improve visibility of focus information and make it easy to perform focusing in manual focus.

Note that, in this embodiment, the transmittance of the optical finder 51 in the finder 50-1 is changed by inserting the ND filter 54 into the optical path of the optical finder 51. However, a method of changing the transmittance is not limited to this method.

In this embodiment, the transmittance of the optical finder 51 in the finder 50-1 is changed by inserting the ND filter 54 into the optical path of the optical finder 51 when the object is bright. However, the transmittance of the optical finder 51 may be always changed when the contrast image is displayed.

Sixth Embodiment

In the first embodiment of the presently disclosed subject matter, the contrast image is superimposed and displayed on the optical image of the optical finder. However, it is likely that, depending on a focus position, a parallax occurs and the optical image and the contrast image deviate from each other.

A sixth embodiment of the presently disclosed subject matter is a form for correcting a parallax according to a focus position. A digital camera 1-5 according to the sixth embodiment is explained below. Note that explanation is omitted concerning portions same as the portions in the first to fifth embodiments.

Figure 10:
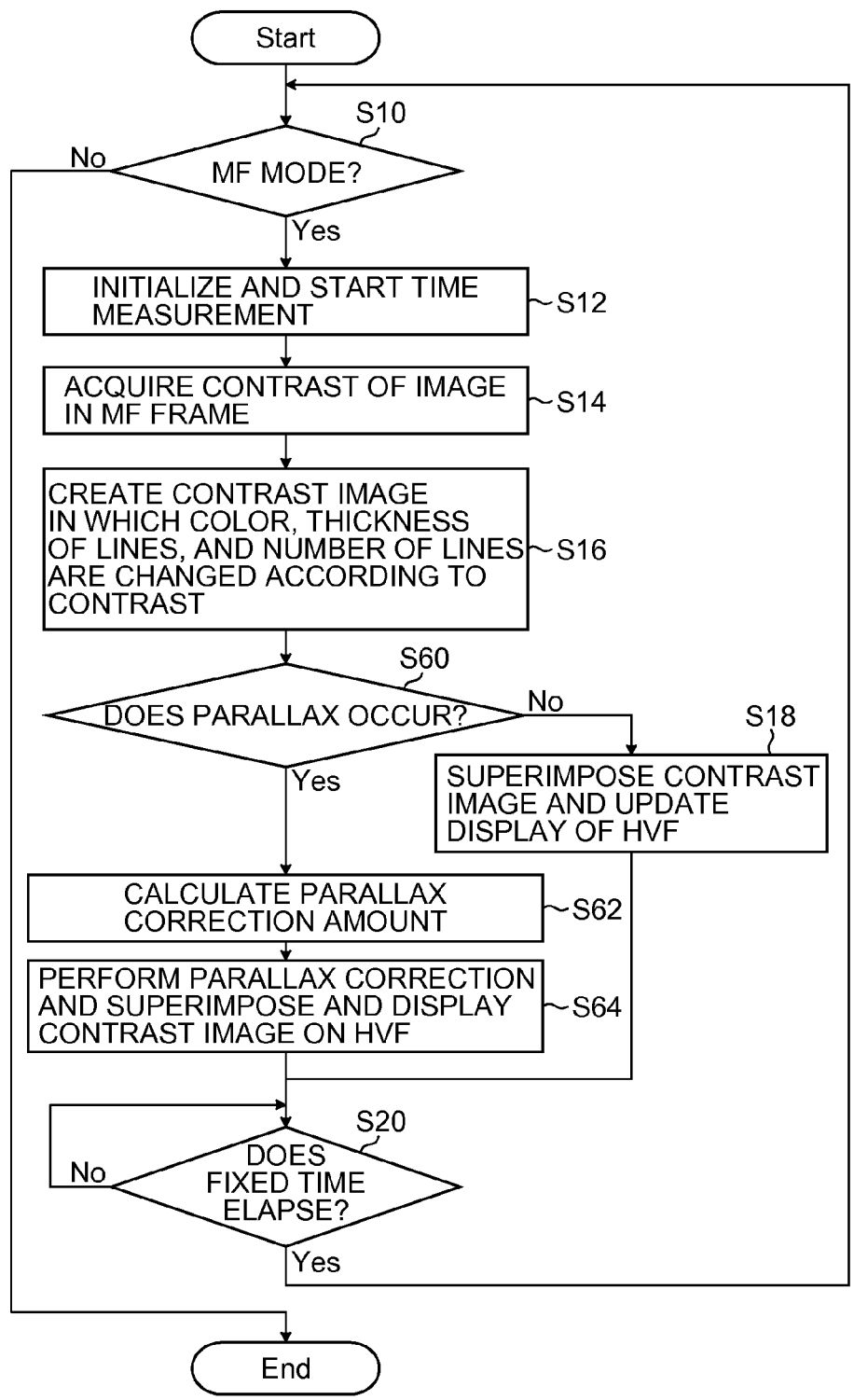
FIG. 10 is a flowchart illustrating a flow of finder display processing at the time when a manual focus mode is set in a sixth embodiment.

FIG. 10 is a flowchart illustrating a flow of finder display processing at the time when a manual focus mode is set. This processing is mainly performed by the CPU 41.

The CPU 41 determines whether the digital camera 1-5 is set in an MF mode (step S10). When the MF mode is not set (NO in step S10), the processing ends.

When the MF mode is set (YES in step S10), in order to periodically update finder display, the CPU 41 initializes and activates the timer 46 (step S12).

The CPU 41 divides an MF frame set in image data into a plurality of areas and inputs the image data to the AF detection circuit 45. The AF detection circuit 45 calculates a contrast evaluation value for each of the areas and inputs the contrast evaluation value to the CPU 41 (step S14). The CPU 41 generates an image (a contrast image) indicating which part is focused with respect to the image data in the MF frame set in the image data (step S16).

The CPU 41 calculates a focus position according to a result obtained by calculating the contrast evaluation value for each of the areas in step S14 and determines, according to the focus position, whether a parallax occurs (step S60). When a distance to the focus position, that is, a focused object is equal to or larger than a predetermined distance (e.g., 2 m), a parallax hardly occurs. On the other hand, when the focus position is closer than the predetermined position (e.g., 2 m), a parallax occurs. Even if an object is the same, deviation occurs between a position in the optical image of the optical finder 51 and a position in the electronic view finder 52. A relation between a focus position and the magnitude of a parallax (a movement amount of an MF frame) and a relation between the focus position and the size of the MF frame are stored in the flash ROM 21. The CPU 41 refers to the relation between the focus position and the magnitude of the parallax and the relation between the focus position and the size of the MF frame and determines whether a parallax occurs in the calculated focus position and whether it is necessary to change the size of the MF frame.

Figure 11:
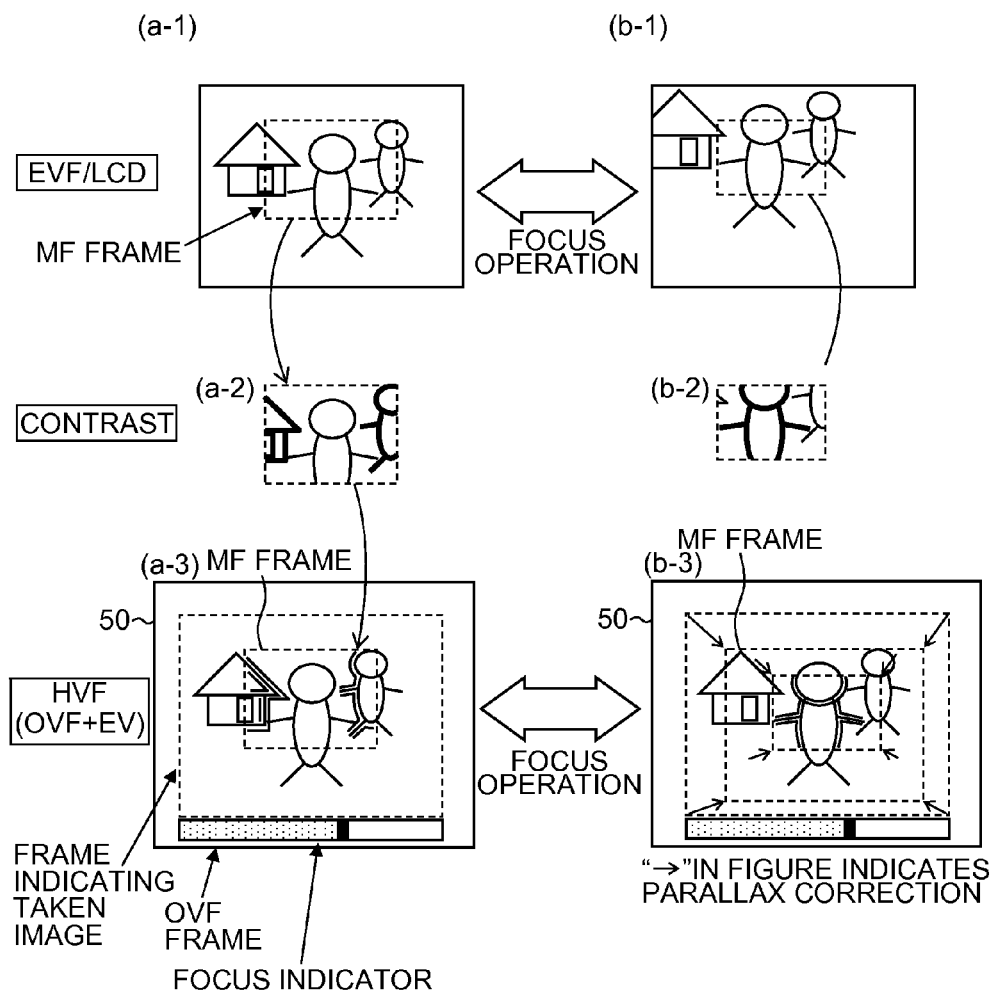
FIG. 11 is a diagram illustrating an image of display of a finder.

When a parallax does not occur (NO in step S60), the CPU 41 displays the contrast image generated in step S16 on the electronic view finder 52. Consequently, display of the finder 50 changes to display in which the contrast image is superimposed and displayed on the optical image of the optical finder 51 (step S18). An (a-1) portion of FIG. 11 is a case in which the focus position is far and a parallax does not occur. Therefore, as illustrated in an (a-3) portion of FIG. 11, a contrast image generated as illustrated in an (a-2) portion of FIG. 11 is displayed on the electronic view finder 52. Consequently, the contrast image is superimposed and displayed on the optical image such that the position of the object in the optical image of the optical finder 51 and the position of the contrast image with respect to the same object coincide with each other.

When a parallax occurs (YES in step S60), the CPU 41 calculates a parallax correction amount according to the relation between the focus position and the magnitude of the parallax (step S62). Note that the parallax correction amount is a concept including a size and a direction. The CPU 41 calculates a change amount of the size of the MF frame, that is, the size of the contrast image according to the relation between the focus position and the size of the MF frame (step S62).

The CPU 41 moves the contrast image generated in step S16 with the size changed in step S62 and by the parallax correction amount calculated in step S62 and displays the contrast image on the electronic view finder 52 (step S64).

A (b-1) portion of FIG. 11 is a case in which the focus position is close, and in this case, a parallax occurs and the size of the MF frame is different from a normal size. Therefore, as illustrated in a (b-3) portion of FIG. 11, the size of the contrast image generated as illustrated in a (b-2) portion of FIG. 11 is changed and the contrast image is shifted to the lower right by the calculated amount and displayed on the electronic view finder 52. Consequently, the position of the optical image of the optical finder 51 and the position of the contrast image coincide with each other. Note that, in the (b-3) portion of FIG. 11, the contrast image is moved to the lower right. However, a correction amount and a correcting direction are not limited to this. A parallax correction amount and a parallax correcting direction are changed according to the position of the optical finder 51 and the focal length of the imaging optical system 12.

The CPU 41 determines whether a predetermined time elapses after the timer 46 is initialized and activated in step S12 (step S20). When the predetermined time does not elapse (NO in step S20), step S20 is performed again. On the other hand, when the predetermined time elapses (YES in step S20), the processing returns to step S10 and the finder display processing at the time when the MF mode is set (steps S10 to S20) is performed repeatedly.

According to this embodiment, even when a parallax is present, it is possible to improve visibility of superimposed display of focus information.

Note that, in this embodiment, presence or absence of a parallax is determined according to the focus position. However, depending on the position of the zoom lens 31, that is, the focal length of the imaging optical system 12, a parallax may occur. Therefore, it is also possible to further retain a relation between a focal length and a parallax correction amount and a relation between the focal length and the size of an MF frame, acquire the position of the zoom lens 31, and calculate a parallax correction amount and the size of the MF frame on the basis of these.

The embodiments of the presently disclosed subject matter are explained above. However, the technical scope of the presently disclosed subject matter is not limited to the scope described in the embodiments. It is evident for those skilled in the art that it is possible to add various alterations and improvements to the embodiments. It is evident from the description of claims that forms added with such alterations and improvements could also be included in the technical scope of the presently disclosed subject matter.

The presently disclosed subject matter can be provided as a computer-readable program code for causing a device (e.g., an electronic camera) to perform the processing explained above, a non-transitory and computer-readable recording medium (e.g., an optical disk (e.g., a CD (Compact Disc), a DVD (Digital Versatile Disc), or a BD (Blu-ray Disc)) or a magnetic disk (e.g., a hard disk or a magneto-optical disk)) in which the program code is stored, and a computer program product for storing an executable code for the method.

It should be noted that the execution order of the respective kinds of processing such as the operations, the procedures, the steps, and the stages in the device, the system, the program, and the method described and shown in the claims, the specification, and the drawings is not particularly clearly indicated as "before", "prior to", or the like and, unless an output of preceding processing is used in following processing, the respective kinds of processing can be realized in arbitrary order. Even if the operation flows in the claims, the specification, and the drawings are explained using "first,", "next," and the like for convenience, this does not mean that it is essential to carry out the operation flows in this order.

What is claimed is:

1. An imaging device comprising:
    an imaging unit configured to image light from an object passed through an imaging optical system including a focus lens to acquire a taken image;
    an optical finder with which an optical image of the object can be observed;
    a setting unit configured to set a manual focus mode for moving the focus lens according to an operation of an operation unit;
    an image generating unit configured to generate a contrast image, which is an image in which an edge of the taken image is enhanced or extracted;
    a displaying unit configured to display the contrast image when the manual focus mode is set;
    an image superimposing unit configured to superimpose the image displayed by the displaying unit on the optical image of the object in the optical finder; and
    a positional deviation amount acquiring unit configured to acquire a deviation amount of the optical image and the contrast image according to a position of the focus lens, wherein
    the displaying unit is an electronic view finder and is configured to correct a position of the contrast image according to the acquired positional deviation amount.

2. The imaging device according to claim 1, further comprising
    a contrast evaluation value calculating unit configured to calculate a contrast evaluation value indicating an integrated value of a high-frequency component of the taken image concerning each of a plurality of areas in the taken image,
    wherein the image generating unit changes at least one of a color of an edge portion and thickness of a line in the edge portion of the contrast image according to the calculated contrast evaluation value.

3. An imaging device comprising:
    an imaging unit configured to image light from an object passed through an imaging optical system including a focus lens to acquire a taken image;
    an optical finder with which an optical image of the object can be observed;
    a setting unit configured to set a manual focus mode for moving the focus lens according to an operation of an operation unit;
    a contrast evaluation value calculating unit configured to calculate a contrast evaluation value indicating an integrated value of a high-frequency component of the taken image concerning each of a plurality of areas in the taken image;
    an image generating unit configured to generate a contrast image, which is an image representing a magnitude of the contrast evaluation value, in each of the plurality of areas;
    a displaying unit configured to display the contrast image when the manual focus mode is set;
    an image superimposing unit configured to superimpose the image displayed by the displaying unit on the optical image of the object in the optical finder; and
    a positional deviation amount acquiring unit configured to acquire a deviation amount of the optical image and the contrast image according to a position of the focus lens, wherein
    the displaying unit is an electronic view finder and is configured to correct a position of the contrast image according to the acquired positional deviation amount.

4. The imaging device according to claim 1,
    wherein the optical finder further includes a transmittance changing unit configured to reduce transmittance of the optical image when the manual focus mode is set.

5. The imaging device according to claim 3,
    wherein the optical finder further includes a transmittance changing unit configured to reduce transmittance of the optical image when the manual focus mode is set.

6. The imaging device according to claim 1, further comprising
a determining unit configured to determine whether the focus lens is being moved when the manual focus mode is set,
wherein the display unit displays the contrast image only while the focus lens is being moved, or while the focus lens is being moved and until a fixed time elapses after the focus lens is stopped.

7. The imaging device according to claim 3, further comprising
a determining unit configured to determine whether the focus lens is being moved when the manual focus mode is set,
wherein the display unit displays the contrast image only while the focus lens is being moved, or while the focus lens is being moved and until a fixed time elapses after the focus lens is stopped.

8. The imaging device according to claim 1,
wherein the imaging optical system and an optical system of the optical finder are separately provided.

9. The imaging device according to claim 1, further comprising
an area setting unit configured to set an area in the taken image,
wherein the image generating unit generates the contrast image for an image in the area set by the area setting unit.

10. The imaging device according to claim 9, further comprising
an area changing unit configured to change at least one of a position and a size of the area.

11. The imaging device according to claim 10, further comprising
a size determining unit configured to determine a change amount of the size of the area according to a position of the focus lens,
wherein the area changing unit changes the size of the area according to the change amount.

12. An imaging method comprising:
a step of imaging light from an object passed through an imaging optical system including a focus lens and acquiring a taken image;
a step of setting a manual focus mode for moving the focus lens according to an operation of an operation unit;
a step of generating a contrast image, which is an image in which an edge of the taken image is enhanced or extracted;
a step of displaying, when the manual focus mode is set, the contrast image on a display unit on which a display content is superimposed on an optical image of the object in an optical finder;
a step of acquiring a positional deviation amount of the optical image and the contrast image according to a position of the focus lens; and
a step of correcting a position of the contrast image according to the acquired positional deviation amount.

13. An imaging method comprising:
a step of imaging light from an object passed through an imaging optical system including a focus lens to acquire a taken image;
a step of setting a manual focus mode for moving the focus lens according to an operation of an operation unit;
a step of calculating a contrast evaluation value indicating an integrated value of a high-frequency component of the taken image concerning each of a plurality of areas in the taken image;
a step of generating a contrast image, which is an image representing a magnitude of the contrast evaluation value, in each of the plurality of areas;
a step of displaying, when the manual focus mode is set, the contrast image on a display unit on which a display content is superimposed on an optical image of the object in an optical finder;
a step of acquiring a positional deviation amount of the optical image and the contrast image according to a position of the focus lens; and
a step of correcting a position of the contrast image according to the acquired positional deviation amount.

14. A non-transitory computer-readable recording medium, wherein when a command stored in the recording medium is read by a processor, the processor executes:
a step of imaging light from an object passed through an imaging optical system including a focus lens to acquire a taken image;
a step of setting a manual focus mode for moving the focus lens according to an operation of an operation unit;
a step of generating a contrast image, which is an image in which an edge of the taken image is enhanced or extracted;
a step of displaying, when the manual focus mode is set, the contrast image on a display unit on which a display content is superimposed on an optical image of the object in an optical finder;
a step of acquiring a positional deviation amount of the optical image and the contrast image according to a position of the focus lens; and
a step of correcting a position of the contrast image according to the acquired positional deviation amount.

15. A non-transitory computer-readable recording medium, wherein when a command stored in the recording medium is read by a processor, the processor executes:
a step of imaging light from an object passed through an imaging optical system including a focus lens to acquire a taken image;
a step of setting a manual focus mode for moving the focus lens according to an operation of an operation unit;
a step of calculating a contrast evaluation value indicating an integrated value of a high-frequency component of the taken image concerning each of a plurality of areas in the taken image;
a step of generating a contrast image, which is an image representing a magnitude of the contrast evaluation value, in each of the plurality of areas in the taken image;
a step of displaying, when the manual focus mode is set, the contrast image on a display unit on which a display content is superimposed on an optical image of the object in an optical finder;
a step of acquiring a positional deviation amount of the optical image and the contrast image according to a position of the focus lens; and
a step of correcting a position of the contrast image according to the acquired positional deviation amount.

* * * * *